S. R. SCREVEN.
ARTIFICIAL TEETH.

No. 52,326.

Patented Jan. 30, 1866.

Witnesses
Francis D. Pastorius
John Anderson

Inventor
Sparkman R Screven

UNITED STATES PATENT OFFICE.

SPARKMAN R. SCREVEN, OF PHILADELPHIA, PENNSYLVANIA.

IMPROVEMENT IN ARTIFICIAL TEETH.

Specification forming part of Letters Patent No. 52,326, dated January 30, 1866.

*To all whom it may concern:*

Be it known that I, SPARKMAN R. SCREVEN, of Philadelphia, in the county of Philadelphia and State of Pennsylvania, have invented an Improved Fastening for Teeth; and I do hereby declare that the following is a full, clear, and exact description thereof, reference being had to the accompanying drawings, and to the letters of reference marked thereon.

The nature of my invention consists of an improved fastening for attaching artificial teeth to rubber or vulcanite.

To enable others to make and use my invention, I will proceed to describe its construction and operation.

Figure 1:
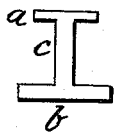
Figure 2:
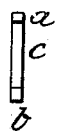
Figure 3:

On reference to the accompanying drawings, which form a part of this specification, Figure 1 is a side view, Fig. 2 is an end view, and Fig. 3 is a sectional view, of a tooth with the fastening inserted into it, and showing in red lines how they are made to join and form a continuous rib around the mouth.

Similar letters refer to similar parts in the several views.

My T-fastening is composed of two flanges, *a* and *b*, which are connected by a rib or web, *c*. They can be made of the same or of different lengths, and be at any distance apart. One is embedded in the tooth while the other is embedded in the rubber or vulcanite base, making a firm and secure connection between the two. Straight and headed round pins are now used for this purpose, but they are so crowded together that there is no strength left in the tooth. In single teeth, narrow ones particularly, where two round pins are used, they are apt to cause the tooth to crack in burning or in packing the case. In narrow teeth, lower ones especially, the pins are set one beneath the other, and in many cases you have to grind away the tooth to the pin before it can be made short enough, whereby the pin, having no hold, drops out. In trimming up the case there is great danger of cutting the heads off the pins. There is only one of my T-fastenings inserted into each tooth, single or block, making it impossible to crack it in burning or in packing the case. It can be set up to any height, that the tooth may be cut to any required length without cutting it out. In trimming up the case there is no possibility of destroying its effectiveness by cutting off its flange. The ends of the flanges can be made to butt or join, Fig. 3, and form, as it were, a rib around the mouth, which makes a stronger hold, and also makes it impossible for the pins to pull out of the rubber or vulcanite base. My T-fastenings are cut out of sheet-platinum in one solid piece by a simple punch-forceps, the cost of which, being so very small, puts it within the reach of every dentist to manufacture for his own use, while the headed pins are made of platinum wire, the heading requiring very delicate and costly machinery. I do not confine myself to the use of platinum.

What I claim as my invention, and desire to secure by Letters Patent, is—

A T-fastening constructed as and for the purpose as herein shown and described.

In testimony whereof I hereunto sign my name to this specification in presence of two subscribing witnesses.

SPARKMAN R. SCREVEN.

Witnesses:
FRANCIS D. PASTORIUS,
W. W. DOUGHERTY.